United States Patent
Colomer

(10) Patent No.: US 8,239,077 B2
(45) Date of Patent: Aug. 7, 2012

(54) METHOD AND DEVICE FOR DETECTING NOISE ON A GUIDE SIGNAL OF LOC TYPE RECEIVED BY AN AIRCRAFT

(75) Inventor: Alexandre Colomer, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 1139 days.

(21) Appl. No.: 12/109,903

(22) Filed: Apr. 25, 2008

(65) Prior Publication Data

US 2009/0005920 A1 Jan. 1, 2009

(30) Foreign Application Priority Data

May 9, 2007 (FR) .................................... 07 54946

(51) Int. Cl.
*G01C 23/00* (2006.01)
*G06F 19/00* (2006.01)
*G01S 1/16* (2006.01)

(52) U.S. Cl. ........... 701/7; 701/3; 701/4; 701/8; 701/16; 701/17; 701/18; 244/75.1; 244/183; 244/185; 244/186; 342/407; 342/410; 342/411; 342/412; 342/413; 73/178 T

(58) Field of Classification Search ............... 701/3, 4, 701/7, 8, 16–18; 244/75.1, 183, 185, 186; 342/407, 410–413; 73/178 T
See application file for complete search history.

(56) References Cited

U.S. PATENT DOCUMENTS

| | | | |
|---|---|---|---|
| 3,918,662 A | | 11/1975 | Vircks et al. |
| 4,482,961 A | * | 11/1984 | Kilner et al. .................... 701/16 |
| 5,014,053 A | * | 5/1991 | Nguyen ........................ 340/979 |
| 6,711,479 B1 | * | 3/2004 | Staggs ............................ 701/16 |
| 2006/0214063 A1 | * | 9/2006 | Firuz et al. .................... 244/175 |

FOREIGN PATENT DOCUMENTS

FR 2.175.834 10/1973

OTHER PUBLICATIONS

"Application of an Optimization-based Design Process for Robust Autoland Control Laws"; G Looye, HD Joos, D Willemsen; American Institute of Aeronautics and Astronautics; Feb. 23, 2004.*

* cited by examiner

*Primary Examiner* — John Nguyen
*Assistant Examiner* — Chuong Nguyen
(74) *Attorney, Agent, or Firm* — Oblon, Spivak, McClelland, Maier & Neustadt, L.L.P.

(57) ABSTRACT

A method and a device for an aircraft for detecting noise in a signal of LOC type. A first step includes estimating a first lateral speed of the aircraft according to a first set of parameters. Concurrently, at least one second lateral speed of the aircraft is estimated according to at least one second set of parameters, among which at least one parameter is of different nature from each parameter of the first set of parameters. A second step includes comparing the first lateral speed and the at least one second lateral speed according to a threshold. If the difference between the first lateral speed and the at least one second lateral speed is greater than the threshold, the presence of noise in the signal of LOC type is detected.

8 Claims, 3 Drawing Sheets

METHOD AND DEVICE FOR DETECTING NOISE ON A GUIDE SIGNAL OF LOC TYPE RECEIVED BY AN AIRCRAFT

BACKGROUND OF THE INVENTION

The present invention relates to automatic flight control for an aircraft and more particularly to a method and device for detecting noise on a guide signal of LOC type received by an aircraft.

There exist systems for assisting a pilot in landing airplanes under poor visibility conditions. Such systems are commonly known as ILS (Instrument Landing System).

An ILS system is generally composed of a ground portion and of a portion on board the airplanes. The ground portion generally comprises radio-frequency transmitters that permit establishment of an imaginary axis of approach to the runway by means of a horizontal radio beam and a vertical radio beam.

The horizontal radio beam, known as Localizer or LOC, establishes the axis of the runway, while the vertical radio beam, known as Guide Slope or GS, establishes the slope of descent of the airplane to the edge of the runway. The LOC emits a VHF (Very High Frequency) signal in the 108-118 MHz frequency band. The GS emits a UHF (Ultra High Frequency) signal in the 329-335 MHz frequency band. Thus the LOC signal is used to determine a difference between the axis of displacement of the airplane and the runway axis, and the GS signal is used to determine a difference between the axis of displacement of the airplane and the nominal approach slope. The LOC and GS beams are narrow and sensitive to perturbations.

Different incidents encountered by the airline companies or during flight tests undertaken by the manufacturers reveal perturbations of the LOC beam. Particular consequences of such perturbations for the automatic flight controls are untimely alarms about excessive deviation, premature engagement in an LOC capture mode, more or less large excursions of the airplane parameters (such as slip angle or yaw rate, close to the ground if the automatic pilot is already in LOC beam holding mode, or an excursion in lateral trajectory if the airplane is in automatic phase of rolling on the ground.

These perturbations can occur in very diverse and sometimes unpredictable situations. For example, these perturbations can occur during an undetected and uncorrected breakdown of the LOC receiver, during an undetected breakdown of an LOC transmitter or during perturbations of the transmitter, especially when an airplane flies over the LOC transmitter on takeoff or stops in front of the LOC transmitter on the runway. In all of these cases, signal reflections cause perturbations while the airplane in automatic landing mode can be at low altitude or on the ground.

The problem is accentuated by the diversity of noise profiles (multiple frequency) and by the fact that the airline companies are tending to generalize the use of automatic landing, even in good visibility.

SUMMARY OF THE INVENTION

A need therefore exists for detecting the perturbations of the LOC signal, especially when the airplane is on the ground. The invention permits at least one of the problems explained hereinabove to be resolved.

Thus the invention has as an object a method in an aircraft for detecting the presence of noise in a signal of LOC type, this method comprising the following steps:

estimation of a first lateral speed of the said aircraft according to a first set of parameters;

estimation of at least one second lateral speed of the said aircraft according to at least one second set of parameters, among which at least one parameter is of different nature from each parameter of the said first set of parameters;

comparison of the said first lateral speed and of the said at least one second lateral speed according to a threshold;

detection of the presence of noise in the said signal of LOC type if the difference between the said first lateral speed and the said at least one second lateral speed is greater than the said threshold.

The method according to the invention thus makes it possible, by means of data available in the aircraft, easily to reduce the effects related to perturbations due to noise present on a guide signal of LOC type received by an aircraft.

According to a particular embodiment, the method additionally comprises a step of validation of the said detection of the presence of noise in the said signal of LOC type, the said validation step being able to be based on at least one parameter of state of the said aircraft. The validation step makes it possible to control the actions to be taken when noise is detected on a guide signal of LOC type and to avoid taking untimely action.

Advantageously, the method additionally comprises a step of relative validation of the said estimates of the said first and at least one second lateral speed, in order to estimate the coherence thereof.

According to a particular embodiment, the said first set of parameters comprises parameters of inertial type.

According to another particular embodiment, the said at least one second set of parameters comprises parameters of guide type determined on the basis of data obtained from a source external to the said aircraft, such as data determined on the basis of a signal of LOC type.

According to a particular embodiment, the method additionally comprises a step of deactivation of an automatic control device of the said aircraft to reduce the differences of trajectory of the aircraft.

The invention also has as an object a device comprising means suitable for implementation of each of the steps of the method described in the foregoing as well as an aircraft equipped with such a device.

The invention also has as an object a computer program comprising instructions suitable for implementation of each of the steps of the method described in the foregoing.

BRIEF DESCRIPTION OF THE DRAWINGS

Other advantages, objectives and characteristics of the present invention become clear from the detailed description hereinafter, given by way of non-limitative example, with reference to the attached drawings, wherein.

DESCRIPTION OF THE PREFERRED EMBODIMENTS

The system according to the invention is installed on board the airplane to detect the presence of noise on the LOC guide signal when the automatic pilot is engaged. If noise is detected on the LOC guide signal, this information is consolidated and then treated to reduce the effects of this noise on the trajectory of the airplane, especially when the airplane is in the phase of rolling on the ground.

The method according to the invention preferably comprises the following three phases: estimation of the lateral speed of the airplane according to at least two different calculation modes, detection of noise on the LOC signal and reduction of the effects of the detected noise. The reduction of the detected noise consists, for example, in disconnecting the automatic pilot. Such an action of resumption of guidance of the airplane on the ground by the pilot can be regarded as the most appropriate for reducing the differences of trajectory of the airplane.

According to the invention, noise detection is based on a difference of the lateral speeds of the airplane relative to the runway, the lateral speeds being worked up on the basis of two independent data sources.

Figure 1:
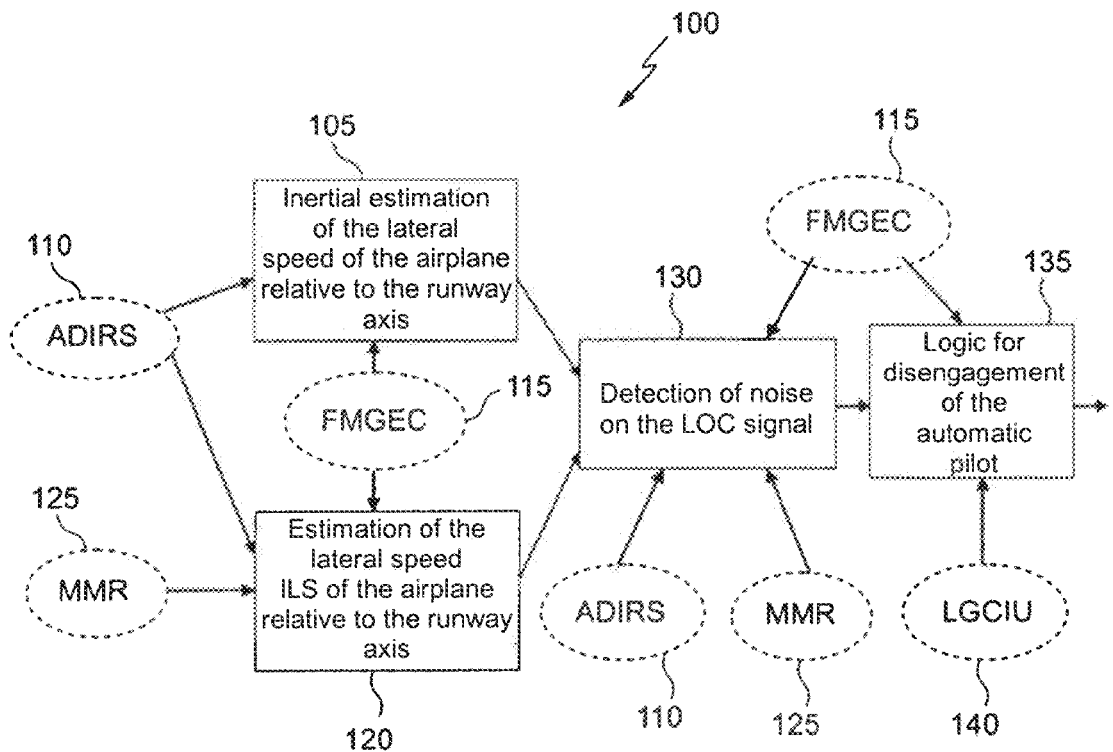
FIG. 1 schematically represents the device according to the invention.

FIG. 1 illustrates the overall diagram of device 100 according to the invention. The elements represented by dashed ellipses are generally already present in the airplanes. As illustrated, device 100 comprises a module 105 for inertial estimation of the lateral speed of the airplane relative to the runway axis, and its inputs are connected to inertial central unit 110 of the airplane (ADIRS, Air Data Inertial Reference System) and to automatic flight control calculator 115 (FMGEC, Flight Management and Guidance Envelope Computer).

Device 100 also comprises a module 120 for estimating the lateral speed determined on the basis of guide information of the LOC signal, known as lateral speed ILS. The inputs of module 120 are connected to inertial central unit 110, to multi-mode receiver 125 (MMR, Multi-Mode Receiver) and to automatic flight control calculator 115.

A module 130 for detecting noise on the LOC guide signal is connected to modules 105 and 120 as well as to modules 110, 115 and 125, while a decision module, such as module 135 for disengagement of the automatic pilot, is connected to module 130 for noise detection, to module 115 and to a calculator 140 for management of information of the landing gear (LGCIU, Landing Gear Control Interface Unit).

The functioning of modules 105, 120, 130 and 135 is described hereinafter.

Module 105 for inertial estimation of the lateral speed of the airplane relative to the runway axis, denoted as $VY_{inertial}$, uses data obtained from calculators generally present in the airplane. The estimate of the inertial lateral speed of the airplane relative to the runway axis is preferably established according to the following relationship $$VY_{inertial} = k \times GND \times (TTRK - QFU_{estimate}) + l_1 \times YAW_{rate}$$

where GND represents the component of the speed, relative to the ground, of the airplane in the horizontal plane (expressed, for example, in knots, kts);

TTRK represents the true track angle of the airplane, defined by the speed vector of the airplane, in the plane X-Y of the ground (expressed, for example, in radians, rd);

$YAW_{rate}$ represents the yaw rate of the airplane (expressed, for example, in radians per second, rd/s);

$l_1$ is the algebraic distance between the IRS (Inertial Reference System), or in other words the inertial central unit of the airplane, and the LOC antenna (expressed, for example, in meters, m);

$QFU_{estimate}$ represents the estimated value of the QFU of the runway in geographic axes, or in other words the geographic heading of the runway (expressed, for example, in radians, rd); and k is a unit conversion variable for conversion, for example, of knots (kts) to meters per second (m/s).

The values of GND, TTRK and $YAW_{rate}$ are supplied by the central inertial unit.

The value $QFU_{estimate}$ can be calculated recursively according to the following formula:

$$QFU_{estimate}(n) = TTRK(n) + (QFU_{estimate}(n-1) - TTRK(n)) \times \frac{n}{n+1}$$

The algorithm for calculating the value $QFU_{estimate}$ is advantageously initiated at a radio-altimetric altitude of 400 feet (approximately 122 meters) when the automatic pilot is engaged.

Figure 2:
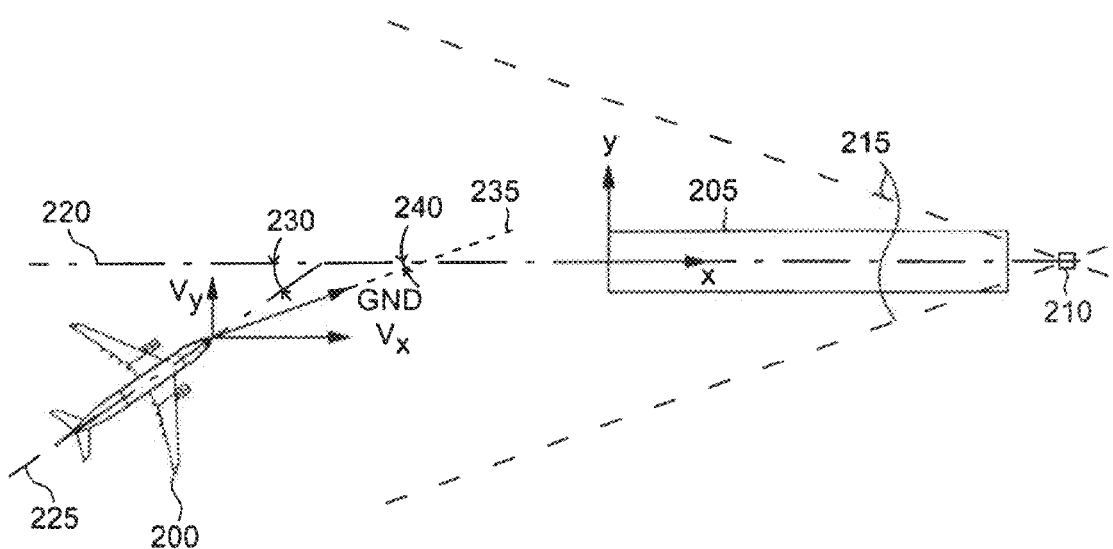
FIG. 2 illustrates the notations used for calculation of the inertial estimate of the lateral speed of an airplane.

FIG. 2 illustrates the notations used for calculating the inertial estimate of the lateral speed of an airplane. When an airplane 200 is approaching runway 205 for a landing, it detects an LOC guide signal of a transmitter 210 if it is in the envelope of transmitted LOC guide signal 215. The LOC guide signal makes it possible to align the speed vector of the airplane along the LOC axis. The average track of the airplane therefore constitutes a good estimate of the LOC axis and of the runway axis, and is all the more precise when the automatic pilot is engaged. Reference 220 establishes the estimated runway orientation, the variable $QFU_{estimate}$ representing the angle between this orientation and geographic north. The airplane axis is established by reference 225, the airplane heading (HDG) representing the angle between this axis and geographic north. This axis can be used to determine angle 230, generally referred to as HDG-$QFU_{estimate}$, formed between the airplane axis and the runway axis determined by the value $QFU_{estimate}$ establishing the runway orientation. Similarly, the axis of displacement of the airplane, determined by the speed vector GND of the airplane and reference 235, makes it possible to evaluate the angle 240 formed between axis 235 of displacement of the airplane and the runway axis. This angle is equal to the difference between the true track of the airplane (TTRK) and $QFU_{estimate}$.

Concurrently, a second estimate of the lateral speed of the airplane relative to the runway is determined by module 120 on the basis of the LOC signal and of IRS parameters.

Figure 3:
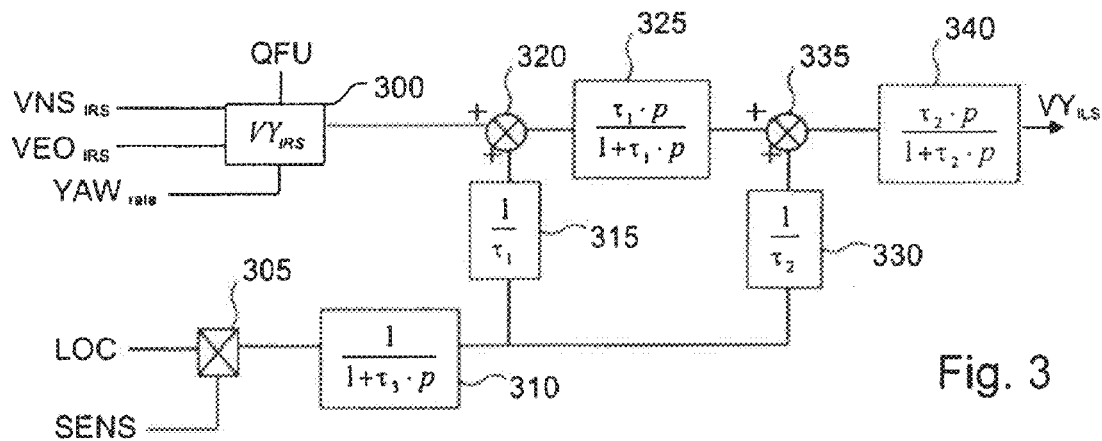
FIG. 3 schematically presents the module for estimation of the lateral speed by means of parameters obtained from guide data.

FIG. 3 schematically represents module 120. A first calculation is performed in submodule 300 to determine a lateral speed $VY_{IRS}$ on the basis of the $VNS_{IRS}$, $VEO_{IRS}$ and $YAW_{rate}$ data obtained from central inertial unit 110 and QFU data supplied by automatic flight control calculator 115. The lateral speed $VY_{IRS}$ is calculated according to the following equation:

$$VY_{IRS} = VNS_{IRS} \times \sin(QFU) - VEO_{IRS} \times \cos(QFU) + l_2 \times YAW_{rate}$$

where: $VNS_{IRS}$ represents the component of the ground speed of the airplane along the geographic north-south axis (expressed, for example, in meters per second, m/s);

$VEO_{IRS}$ represents the component of the ground speed of the airplane along the geographic east-west axis (expressed, for example, in meters per second, m/s);

$I_2$ is the algebraic distance between the IRS, or in other words the central inertial unit of the airplane, and the LOC antenna (expressed, for example, in meters, m), $I_1=I_2$; and $YAW_{rate}$ is the yaw rate of the airplane (expressed, for example, in radians per second, rad/s).

Simultaneously, the LOC signal representing the difference between the axis of the LOC radio beam and the position of the receiving antenna of the airplane is combined with the signal SENS representing the sensitivity of the LOC radio beam in multiplier 305. The LOC signal can be expressed, for example, in microamperes, while the SENS signal can be expressed in meters per microampere. The LOC signal is obtained from multi-mode receiver 125, while the SENS signal is supplied by automatic flight control computer 115.

A low-pass filter 310 having a time constant $\tau_3$ is applied to the signal obtained from multiplier 305. A gain $1/\tau_1$ is then applied to the filtered signal in submodule 315 before this is added to the lateral speed $VY_{IRS}$ in adder 320. The signal obtained from adder 320 is filtered in a high-pass filter 325 having time constant $\tau_1$. The output of high-pass filter 325 represents a filtered drift $VY_{IRS}$ of the lateral position of the LOC receiving antenna of the airplane, corresponding to a first estimate of the lateral speed ILS ($VY_{ILS}$).

Similarly, a gain $1/\tau_2$ is applied in submodule 330 to the signal filtered by low-pass filter 310, before this is added to the signal obtained from high-pass filter 325 in adder 335. The signal obtained from adder 335 is filtered in a high-pass filter 340 having the time constant $\tau_2$ to form the lateral speed signal $VY_{ILS}$.

The two high-pass filters 325 and 340 associated with the two submodules 315 and 330 are complementary filters, mounted in cascade, for estimating the lateral speed ILS.

The values of the time constants $\tau_1$, $\tau_2$ and $\tau_3$ are preferably optimized such that the lateral speed $VY_{ILS}$ is representative in frequency of the response of the airplane being guided on the ground by the automatic pilot.

The lateral speed $VY_{ILS}$ calculated in this way is therefore the result of two complementary filters applied to inertial data and to information obtained from the multi-mode receiver.

Figure 4:
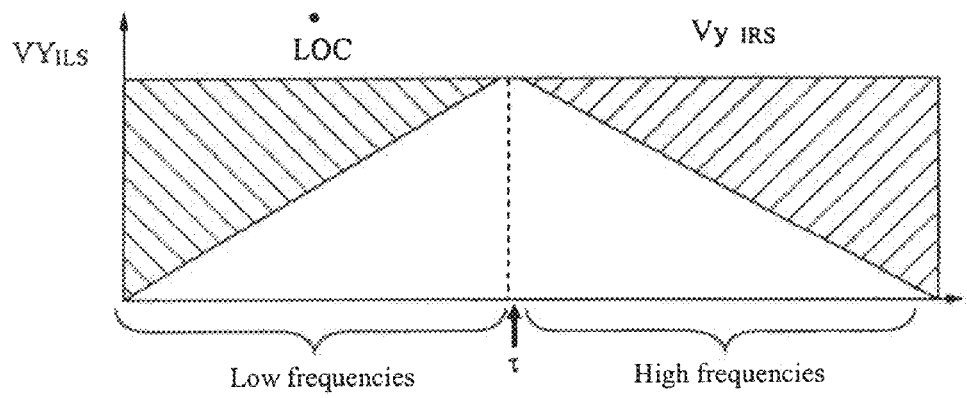
FIG. 4 illustrates the frequency content of the lateral speed estimated according to the module represented in FIG. 3.

As illustrated in FIG. 4, which shows a schematic representation, it should be noted here that, at low frequency, the lateral speed $VY_{ILS}$ is equivalent to the drift of the LOC signal, whereas, at high frequency, the lateral speed $VY_{ILS}$ behaves as an inertial lateral speed ($\tau$ represents a composite variable related to the time constants $\tau_1$, $\tau_2$ and $\tau_3$).

Noise detection module 130 algebraically compares the two values of lateral speed obtained in modules 105 and 120. The algebraic difference of these lateral speeds is compared to a predetermined threshold, typically a threshold fixed at 1 meter per second. If the difference is larger than or equal to the predetermined threshold, a first condition for detection of noise on the LOC signal is achieved. This condition is preferably validated by a complementary mechanism such as described hereinafter.

It should be noted here that this threshold is the result of a compromise between, on the one hand, the need to detect noise levels on the LOC signal that have effects the trajectory of the airplane in automatic rolling phase that may cause it to stray off the runway and, on the other hand, the requirement that the automatic pilot not be disengaged in untimely manner.

Advantageously, noise detection is validated only if the phase of approach of the airplane has been achieved with an automatic pilot engaged sufficiently soon (the convergence and precision of the calculation of the QFU of the runway necessitate that the average track of the airplane be close to QFU) and if the data necessary for calculation of the inertial lateral speeds and ILS are valid, or in other words sufficiently precise and mutually coherent. In particular, since the precision of the TTRK parameters becomes poorer at low speed, the detection of LOC noise is preferably inhibited for GND speeds slower than 80 knots, or in other words approximately 150 kilometers per hour.

Figure 5:
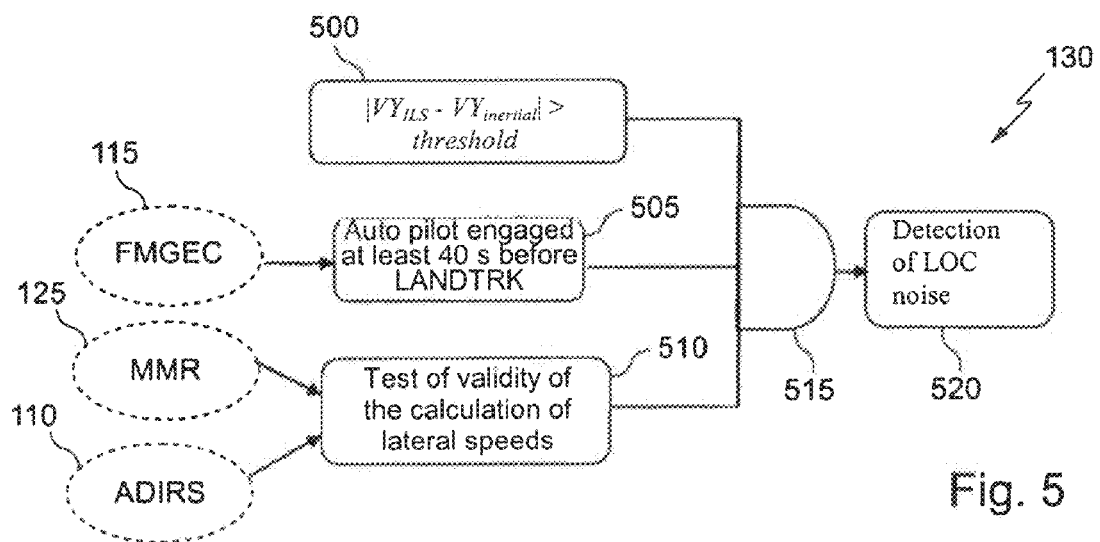
FIG. 5 schematically represents the module for detecting noise on a signal of LOC type.

FIG. 5 illustrates the algorithm implemented in noise detection module 130. A submodule 500 is used to calculate the algebraic difference between the two estimated lateral speeds and to compare this difference with a predetermined threshold. Concurrently, submodule 505 verifies, by means of data obtained from automatic flight control calculator 115, that the automatic pilot has been engaged for a sufficient time, for example for longer than 40 seconds, before the LANDTRK guide phase, corresponding to a radio-altimetric altitude of lower than 400 feet (approximately 122 meters), is tripped. Similarly, submodule 510 verifies, by means of data obtained from multi-mode receiver 125 and from the central inertial unit of the airplane, that the estimated lateral speeds are coherent. For example, submodule 510 checks the difference of the estimated lateral speeds over time and invalidates their value when the GND speed of the airplane is slower than 80 knots (approximately 150 kilometers per hour). If the three conditions determined by submodules 500, 505 and 510 are verified, for example by means of a logical AND 515 on the signals obtained from these submodules, an indication according to which noise is detected on the LOC signal is emitted by submodule 520.

According to a particular embodiment, the indication according to which noise is detected on the LOC signal is used to disengage the automatic pilot. Preferably this disconnection can take place only if the airplane is on the ground in 3-point position, meaning that the main landing gear and the nose landing gear are in compressed position. This condition makes it possible to ensure that the pilot can resume manual control of the airplane in a comfortable configuration.

Figure 6:
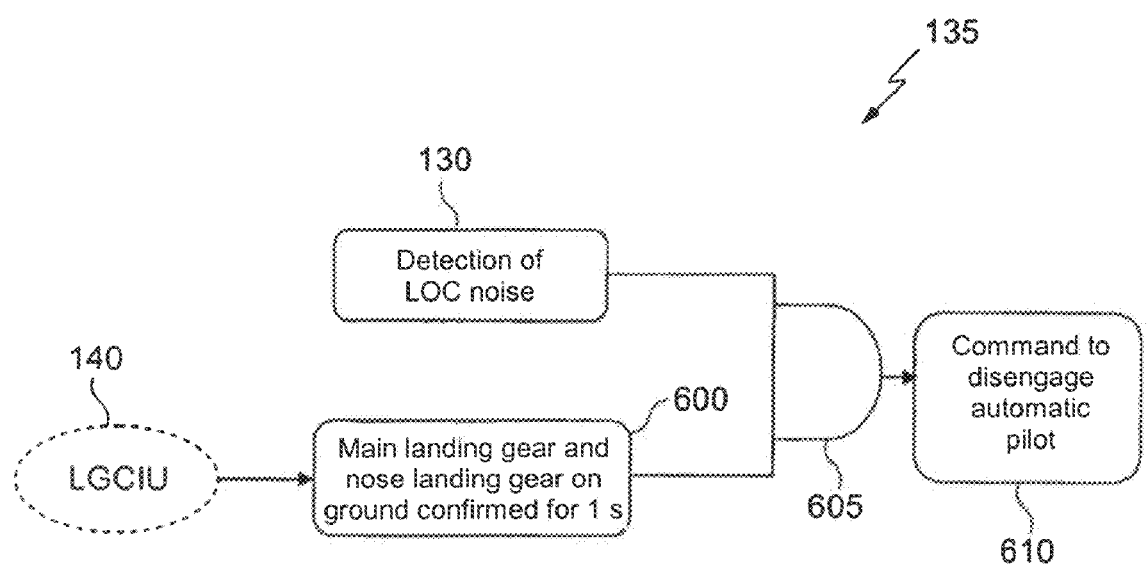
FIG. 6 schematically illustrates an example of a module for implementing a corrective action when the presence of noise on a signal of LOC type has been detected.

FIG. 6 schematically illustrates the algorithm of module 135 for controlling disengagement of the automatic pilot. As illustrated, a submodule 600 verifies that the action related to detection of noise on the LOC signal can be effected. By means of data obtained from calculator 140 for management of information related to the landing gear, submodule 600 verifies here that the airplane is positioned on the ground and more particularly that the main landing gear and the nose landing gear have been positioned on the ground for longer than one second. If noise was detected on the LOC signal in module 130, and if the airplane is positioned on the ground, the action related to detection of noise on the LOC signal can be effected. This verification can be achieved by means of logical AND 605. If the conditions are verified, the action is then effected. In this case a command to disengage the automatic pilot is generated by submodule 610.

The device according to the invention therefore makes it possible to detect noise on the LOC guide beam when the automatic pilot is engaged, so as to reduce the effects during the rolling phase. In addition, the device according to the invention makes it possible to achieve a low disturbance rate, meaning that it does not detect noise unduly, since this would have the consequence of disconnecting the automatic pilot in untimely manner during the rolling phase. Similarly, the device according to the invention makes it possible to obtain a sufficient availability factor, taking into account system conditions that inhibit the noise detector.

Although the system for detecting noise on the LOC signal in the manner described hereinabove acts on the automatic pilot by commanding its disconnection, it is possible to use the information on differences of lateral speeds for other purposes, especially to modify the guide orders of the automatic pilot, to display corresponding information or to forewarn the crew by means of a specific alarm.

It also should be noted that the inertial lateral speed can be calculated differently. In particular, the estimate of the QFU of the runway can be achieved by a different algorithm or can be obtained from another source of the airplane.

Similarly, the lateral speed ILS can be calculated differently. In particular, the information originating from central inertial units may not be used.

It is also possible to implement a different logic for detecting noise on the LOC signal. In particular, the threshold value used to compare the lateral speeds can be variable and can depend on parameters related to the airplane.

Similarly, the logic for disengagement of the automatic pilot can be different. In particular, the duration of confirmation of the information that the airplane is on the ground in 3-point position may depend on parameters related to the airplane instead of being fixed. Other conditions may be added, especially the speed of the wheels of the landing gears.

Naturally a person competent in the field of the invention will be able to apply modifications in the foregoing description in order to satisfy specific needs.

The invention claimed is:

1. A method for detecting, in an aircraft, the presence of noise in a localizer (LOC) signal, the method comprising:
   estimating a first lateral speed of the aircraft on the basis of inertial information according to a first set of parameters;
   estimating at least one second lateral speed of the aircraft on the basis of guide information of the LOC signal according to at least one second set of parameters, among which at least one parameter is of different nature from each parameter of the first set of parameters;
   comparing the first lateral speed and the at least one second lateral speed and obtaining a difference between the first lateral speed and the at least one second lateral speed;
   verifying the difference with a threshold;
   verifying an automatic pilot has been engaged for a sufficient predetermined time;
   verifying the estimated first lateral speed and the estimated at least one second lateral speed are coherent; and
   indicating a presence of noise in the LOC signal when the difference between the first lateral speed and the at least one second lateral speed is greater than the threshold and the automatic pilot has been engaged for the sufficient predetermined time and when the estimated lateral speeds are coherent.

2. The method according to claim 1, further comprising:
   validating the detecting of the presence of noise in the LOC signal.

3. The method according to claim 2, wherein the validating is based on at least one parameter of a state of the aircraft.

4. The method according to claim 1, further comprising:
   validating the estimating steps of the first and at least one second lateral speed.

5. The method according to claim 1, further comprising:
   deactivating an automatic pilot control device of the aircraft.

6. A device for detecting, in an aircraft, the presence of noise in a localizer (LOC) signal, the device comprising:
   an estimator configured to estimate a first lateral speed of the aircraft on the basis of inertial information according to a first set of parameters;
   a second estimator configured to estimate at least one second lateral speed of the aircraft on the basis of guide information of the LOC signal according to at least one second set of parameters, among which at least one parameter is of different nature from each parameter of the first set of parameters;
   a comparator configured to compare the first lateral speed and the at least one second lateral speed and obtain a difference between the first lateral speed and the at least one second lateral speed;
   a first verifier configured to verify the difference with a threshold;
   a second verifier configured to verify an automatic pilot has been engaged for a sufficient predetermined time;
   a third verifier configured to verify the estimated first lateral speed and the estimated at least one second lateral speed are coherent; and
   an indicator configured to indicate detect presence of noise in the LOC signal when the difference between the first lateral speed and the at least one second lateral speed is greater than the threshold and the automatic pilot has been engaged for the sufficient predetermined time and when the estimated lateral speeds are coherent.

7. A non-transitory computer readable storage medium encoded with executable instructions which when executed by a processor cause the processor to perform a method comprising:
   estimating a first lateral speed of the aircraft on the basis of inertial information according to a first set of parameters;
   estimating at least one second lateral speed of the aircraft on the basis of guide information of the LOC signal according to at least one second set of parameters, among which at least one parameter is of different nature from each parameter of the first set of parameters;
   comparing the first lateral speed and the at least one second lateral speed and obtaining a difference between the first lateral speed and the at least one second lateral speed;
   verifying the difference with a threshold;
   verifying an automatic pilot has been engaged for a sufficient predetermined time;
   verifying the estimated first lateral speed and the estimated at least one second lateral speed are coherent; and
   indicating a presence of noise in the LOC signal when the difference between the first lateral speed and the at least one second lateral speed is greater than the threshold and the automatic pilot has been engaged for the sufficient predetermined time and when the estimated lateral speeds are coherent.

8. An aircraft equipped with a device according to claim 6.

* * * * *